United States Patent

Kurihara

[11] Patent Number: 5,854,781
[45] Date of Patent: Dec. 29, 1998

[54] TRACK DETECTION CIRCUIT FOR OPTICAL DISC PLAYBACK APPARATUS

[75] Inventor: Shinji Kurihara, Gunma-ken, Japan

[73] Assignee: Sanyo Electric Co., Ltd., Osaka, Japan

[21] Appl. No.: 962,053

[22] Filed: Oct. 31, 1997

[30] Foreign Application Priority Data

Oct. 31, 1996 [JP] Japan ................................ 8-290692

[51] Int. Cl.$^6$ .......................................... G11B 7/00
[52] U.S. Cl. ..................... 369/124; 369/44.28; 369/44.32
[58] Field of Search ..................... 369/44.28, 44.32, 369/124

[56] References Cited

U.S. PATENT DOCUMENTS

5,046,058  9/1991  Shimonou ................................. 369/32
5,532,990  7/1996  Koyama et al. ....................... 369/44.29

Primary Examiner—Tod R. Swann
Assistant Examiner—Kim-Kwok Chu
Attorney, Agent, or Firm—Loeb & Loeb LLP

[57] ABSTRACT

Bottom detection circuit (5) detects the bottom of an RF signal from an addition circuit (3). The output signal of bottom detection circuit (5) is converted into a digital signal with A/D conversion circuit (10) to obtain maximum and minimum values using maximum value detection circuit (12) and minimum value detection circuit (13). The maximum and minimum values are applied to an arithmetic processing circuit (14) and a reference value is calculated based on that minimum value or maximum value. The reference value is held with hold circuit (15) and then converted into an analog signal with D/A conversion circuit (16). During track jumping, the output signal of bottom detection circuit (5) is compared with a reference voltage Vref corresponding to the reference value with comparison circuit (17) to obtain an output signal that corresponds to the presence or absence of a track. In this manner, track detection based on the bottom detection output of an RF signal is not affected by scratches or the like on an optical disc, and accurate track detection is possible. Tracks are detected using the peak detection output when only the peak detection output of the RF signal is unaffected by the presence of scratches or the like on the optical disc.

10 Claims, 5 Drawing Sheets

TRACK DETECTION CIRCUIT FOR OPTICAL DISC PLAYBACK APPARATUS

BACKGROUND OF THE INVENTION

1. Field of the Invention

The present invention relates to a track detection circuit of an optical disc playback apparatus that detects the presence or absence of a track that may have been crossed during track jumping.

2. Description of the Related Art

Optical disc playback apparatuses have been provided with a track jump function used to jump over a plurality of tracks on optical discs. In such a track jump function, the number of tracks to be jumped was set first, before the track jumping process started. During track jumping, the number of tracks that were jumped was counted based on a track detection signal that changed levels according to the presence or absence of tracks. Track jumping stopped when the prescribed number of tracks was reached. Counting of tracks was performed based on the track detection signal, as shown in the example of a known track detection circuit that generates this track detection signal shown in FIG. 1.

Figure 1:
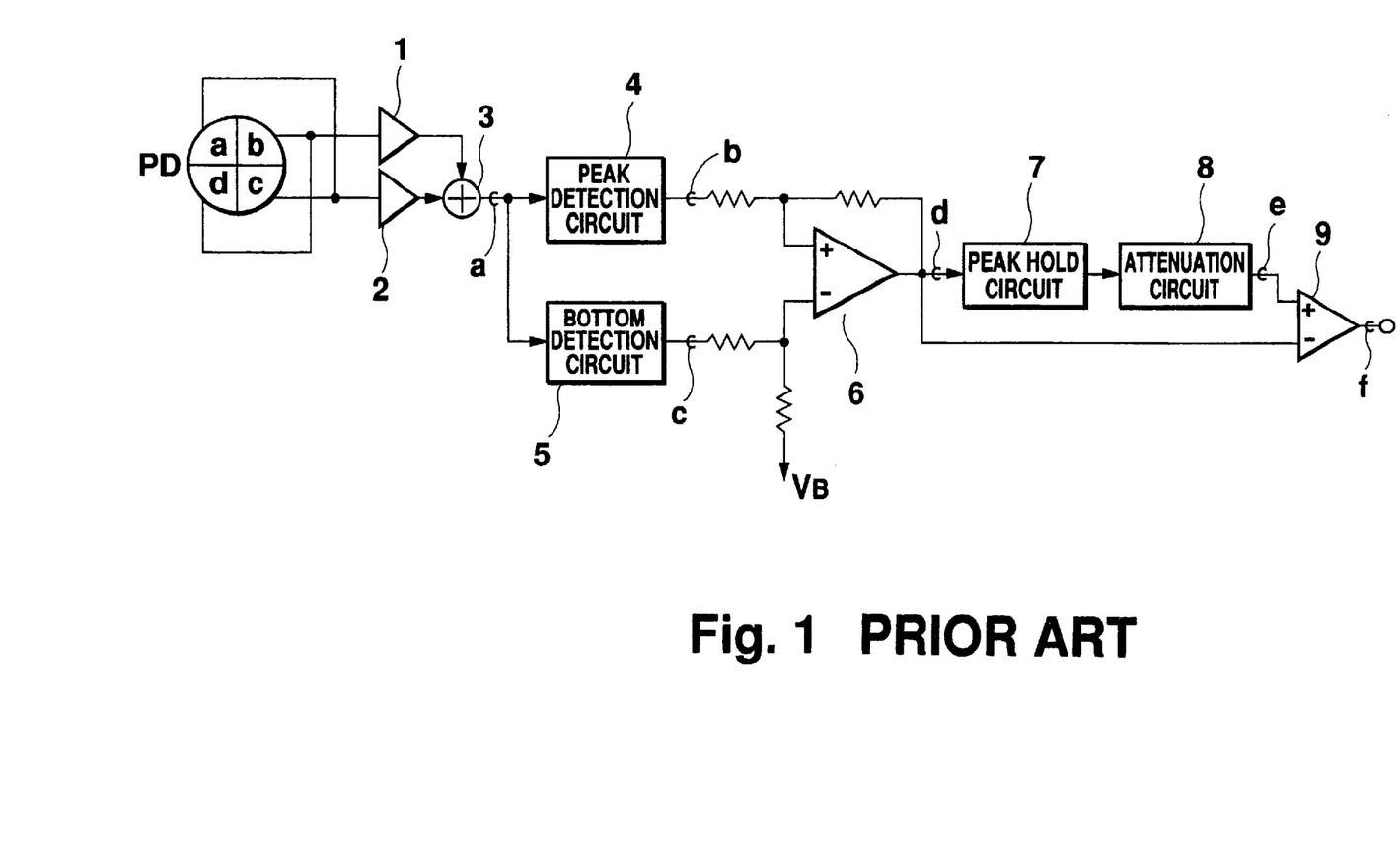
FIG. 1 is a block diagram showing an example of the prior art.

In FIG. 1, laser light reflected by an optical disc (not shown) is irradiated onto photodiodes PDa, PDb, PDc, and PDd divided into four sections. In addition to functioning as a focusing error servo, this laser light also functions as the main laser light for obtaining an RF signal used for audio signal playback processing.

In addition to two sub-laser lights for performing tracking errors, this laser light also is used to perform error detection using a method known as the 3 spot method. After adding the output signals of photodiodes PDa and PDc generated by photoelectric conversion of the laser light, the resulting signal is amplified with amplification circuit 2. In addition, after adding the output signals of photodiodes PDb and PDd, the resulting signal is amplified with amplification circuit 1. The output signals of amplification circuits 1 and 2 are added with addition circuit 3 to obtain the RF signal.

Figure 2A:
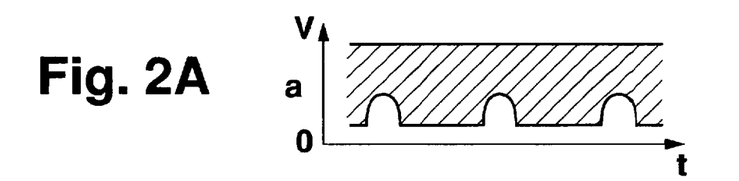
FIGS. 2A, 2B, 2C, 2D, 2E and 2F are waveform drawings showing the respective output waveforms of the circuit of FIG. 1.
Figure 2B:
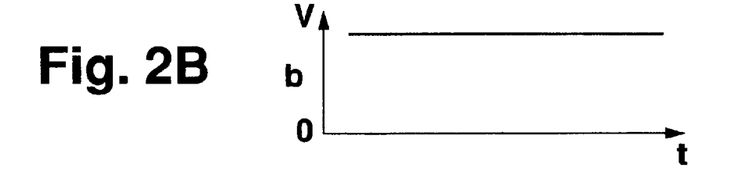
Figure 2C:
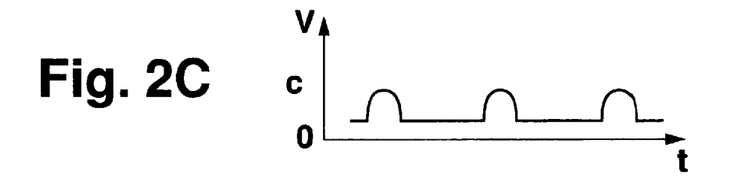
Figure 2D:
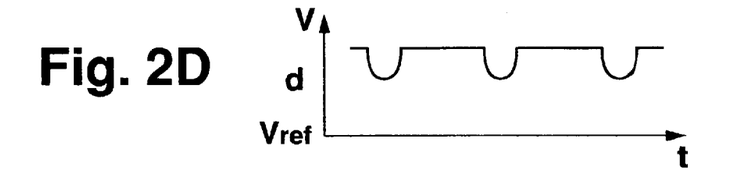

Here, when the spot of light corresponding to track jump shifts in the radial direction over the optical disc, the upper value of output signal a of addition circuit 3 becomes a constant voltage as shown in FIG. 2A, while the bottom value is a signal in which the level changes according to the presence or absence of a track. In addition to the peak of output signal a being detected with peak direction circuit 4, the bottom limit is detected with bottom detection circuit 5. Consequently, output signal b of peak detection circuit 4 is a signal in which the envelope of the upper signal of FIG. 2A is detected as shown in FIG. 2B, while output signal c of bottom detection circuit 5 is a signal in which the envelope of the lower signal of FIG. 2A is detected as shown in FIG. 2C. Output signals b and c of peak detection circuit 4 and bottom detection circuit 5 are subtracted at subtraction circuit 6, and as a result of this subtraction, output signal d is obtained as shown in FIG. 2D at subtraction circuit 6.

Figure 2E:
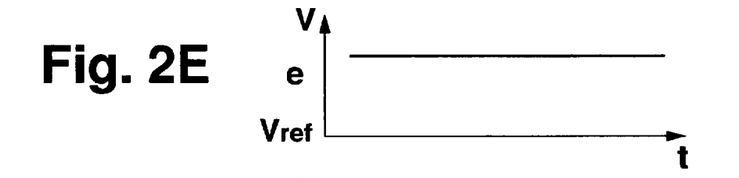
Figure 2F:
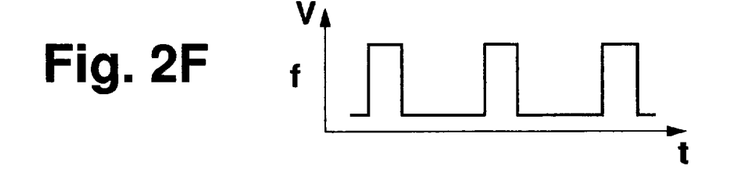

Following this, output signal d of subtraction circuit 6 is applied to peak hold circuit 7. Since the time constant of peak hold circuit 7 is set to be sufficiently larger than the change in output signal d, the output signal of peak hold circuit 7 is the value resulting from holding the peak value of output signal d. The output signal of peak hold circuit 7 is then attenuated with attenuation circuit 8, and reference value e of comparison circuit 9 of the latter stage is obtained as a result of this attenuation as shown in FIG. 2E. Output signal d of subtraction circuit 6 and reference value e are compared in comparison circuit 9, and a track detection signal f is generated corresponding to the presence or absence of a track at output terminal OUT as shown in FIG. 2F.

Figure 3A:
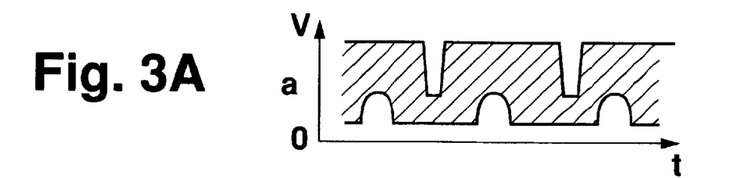
FIGS. 3A, 3B, 3C, 3D, 3E and 3F are waveform drawings showing the respective output waveforms of the circuit of FIG. 1 when using an optical disc containing a scratch.
Figure 3B:
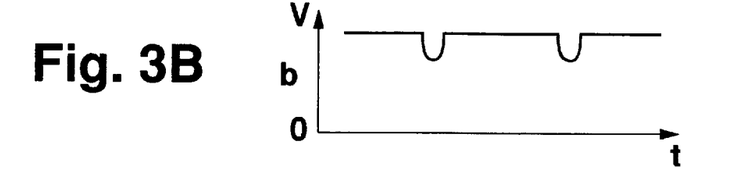
Figure 3C:
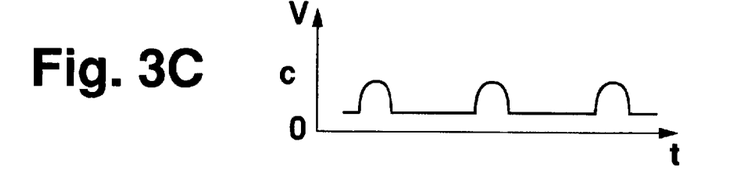
Figure 3D:
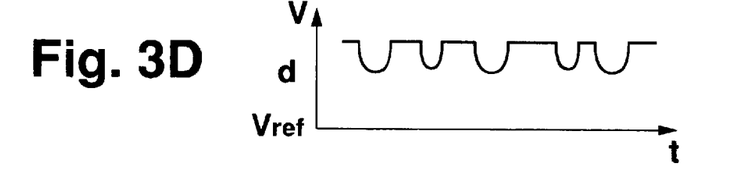
Figure 3E:
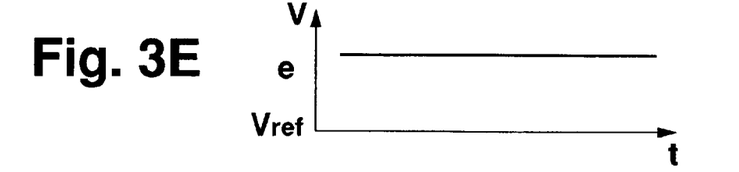
Figure 3F:
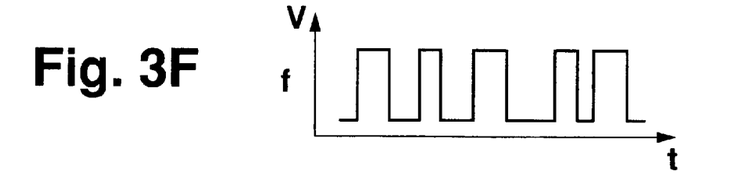

However, if there is a scratch in the optical disc, the top of output signal a of addition circuit 3 fluctuates as shown in FIG. 3A. When the peak of this output signal a is detected, the level of output signal b of peak detection circuit 4 fluctuates at the scratched portion of the optical disc as shown in FIG. 3B. However, output signal c of bottom detection circuit 5 is not affected by scratches. Although output signals b and c of peak detection circuit 4 and bottom detection circuit 5 are subtracted at subtraction circuit 6, changes due to the presence or absence of a track and changes caused by the scratch are generated as shown in FIG. 3D in output signal d of subtraction circuit 6. Track detection signal f is then obtained as shown in FIG. 3E by comparing this output signal d with reference value 3 in comparison circuit 9. As is clear from FIG. 3E, changes in the RF signal caused by the presence of a scratch are also mistakenly detected as a track, and that result appears in the track detection signal.

According to the example of the prior art of FIG. 1, in the case of moving a spot of light in the radial direction over an optical disc containing a scratch, there was the problem of the scratch also being detected as a track. Consequently, during track jump, it was not possible to correctly count the number of tracks, thus preventing track jumping for the set number of tracks.

SUMMARY OF THE INVENTION

In order to solve the above-mentioned problem, the object of the present invention is to provide a circuit for accurately detecting the tracks on an optical disc that are crossed when a spot of light moves in the radial direction over an optical disc without being affected by scratches and so forth on the optical disc.

In order to achieve the above-mentioned object, the track detection circuit for an optical disc playback apparatus of the present invention is a circuit for detecting the tracks on an optical disc that are crossed when a light spot moves in the radial direction over the optical disc, comprising a detection circuit for detecting either the bottom or peak of a signal obtained by reading the above-mentioned optical disc; an analog/digital conversion circuit for converting the output signal of said detection circuit to a digital signal; a digital processing circuit for obtaining a reference value according to the digital signal from said analog/digital conversion circuit; a digital/analog conversion circuit for generating a reference signal by performing digital/analog conversion on the reference value from said digital processing circuit; and a comparison circuit that compares the output signal from said detection circuit and said reference signal supplied from said digital/analog conversion circuit; wherein, tracks that are crossed are detected based on the comparison output signal from said comparison circuit.

In addition, a track detection circuit pertaining to another aspect of the present invention is a track detection circuit for an optical disc playback apparatus for detecting the tracks on an optical disc that are crossed when a spot of light moving in the radial direction over the optical disc, comprising a detection circuit for detecting a signal obtained by reading an optical disc to obtain a bottom level or peak level that changes when the spot of light moves in the radial direction of an optical disc and crosses a track, but does not change due to the presence of missing data stored on said optical disc; a reference signal production circuit for producing a reference value based on said bottom level or peak level obtained with said detection circuit; and a comparison circuit for comparing the output signal from said detection circuit and said reference value produced with said reference value production circuit; wherein, tracks that are crossed are detected based on the comparison output signal from said comparison circuit.

In addition, the above-mentioned track detection circuit may further be equipped with an analog/digital conversion circuit that converts the analog output signal of said detection circuit to a digital signal, and supplies said digital signal to said reference value production circuit; and a digital/analog conversion circuit for converting said reference value from said reference value production circuit into an analog signal and supplies said analog signal to said comparison circuit; said reference value production circuit being equipped with: a maximum value detection circuit that detects the maximum value of the digital signal from said analog/digital conversion circuit and a minimum value detection circuit that detects said minimum value; and, an arithmetic processing circuit for determining said reference value by performing arithmetic processing using said detected maximum and minimum values.

According to the present invention, when a spot of light crosses an optical disc, the bottom or peak of an RF (Radio Frequency) signal is detected, and the bottom or peak is converted to a digital signal by an A/D conversion circuit. The output signal of the A/D conversion circuit is applied to a digital processing circuit resulting in the generation of a reference value. This reference value is then converted to a reference signal by a D/A conversion circuit and then applied to a comparison circuit. The bottom value or peak value is compared with the reference signal with a comparison circuit, and a track detection signal is generated, the level of which changes according to the presence or absence of a track. At this time, since either the bottom or peak of the RF signal is compared with the reference signal, a change in the RF signal caused by a scratch is blocked with the detection circuit, thereby preventing any changes caused by scratches from being contained in the track detection signal.

According to the present invention, since a reference value for comparing the bottom value of an RF signal is generated only according to the change in an RF signal resulting from the presence or absence of a track, changes in the peak of an RF signal caused by the occurrence of an error in data read from an optical disc, such as that caused by a scratch, are blocked with, for example, a bottom detection circuit, thereby making it possible to prevent a scratch from having effects on the track detection signal. Consequently, mistakenly counting a scratch on the optical disc as a track can be prevented.

In addition, in the present invention, the above-mentioned track detection circuit may be equipped with a maximum value detection circuit for detecting the maximum value of the digital signal from said analog/digital conversion circuit and a minimum value detection circuit that detects a minimum value; an arithmetic processing circuit that determines said reference value by performing arithmetic processing using said detected maximum and minimum values; and, a hold circuit that holds the output signal from said arithmetic processing circuit.

Moreover, in the above-mentioned track detection circuit, the above-mentioned arithmetic processing circuit determines the reference value by calculating (Vmax−Vmin)×N+Vmin using, for example, the detected maximum value Vmax, minimum value Vmin and a coefficient N from 0 to 1.

In this manner, by digitally obtaining a reference value corresponding to the maximum and minimum values of a bottom value, processing to obtain the reference value can be easily modified, thereby enabling the reference value to be set according to the duty factor of the track detection signal.

In addition, in the present invention, if the above-mentioned coefficient N is set so that the duty factor of the comparison output signal from the above-mentioned comparison circuit becomes, for example, about 0.5, it becomes easy to count the number of tracks based on the comparison output signal.

Moreover, in the above-mentioned track detection circuit of the present invention, during calculation of the above-mentioned reference value, the speed at which the spot of light crosses the track of the optical disc is controlled to a speed at which the sampling frequency of the analog/digital conversion circuit can respond to the change in the output signal of the detection circuit.

In this manner, when setting the reference value, if the movement speed of the optical pick-up is changed so that the sampling frequency of the A/D conversion circuit responds to the changes in the RF signal, an accurate reference value can be obtained.

DESCRIPTION OF THE PREFERRED EMBODIMENT

Figure 4:
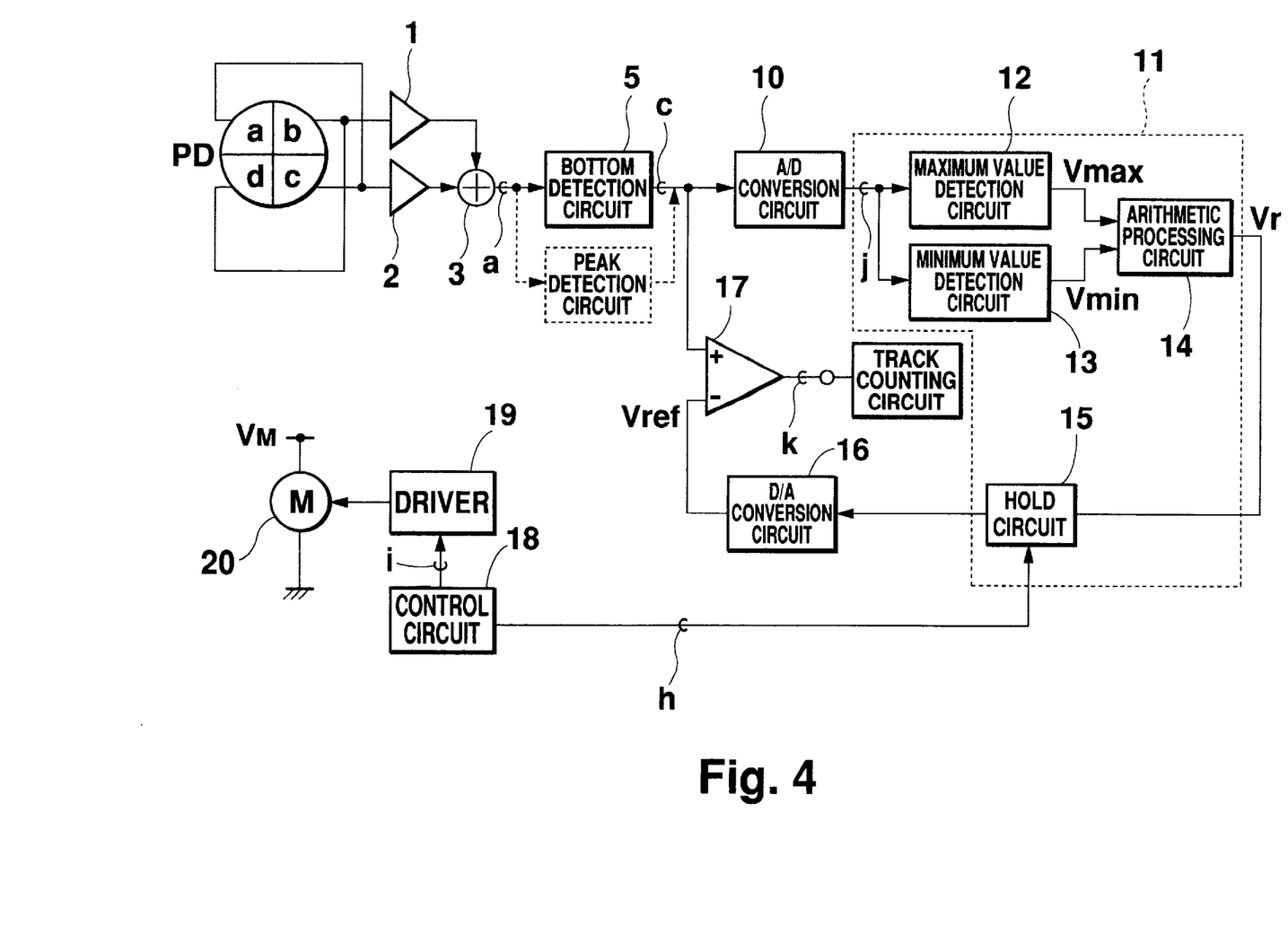
FIG. 4 is a block diagram showing an embodiment of the present invention.

FIG. 4 is a drawing showing an embodiment of the present invention. Reference numeral 10 is an A/D conversion circuit that converts the output signal of bottom detection circuit 5 to a digital signal. Reference numeral 11 designates a digital processing circuit that functions as a reference value production circuit, and is composed of maximum value detection circuit 12, which detects the maximum value of the output signal of A/D conversion circuit 10; minimum value detection circuit 13, which detects the minimum value of the output signal of A/D conversion circuit 10; arithmetic processing circuit 14, which calculates a reference value from the output signals of maximum value detection circuit 12 and minimum value detection circuit 13; and hold circuit 15, which holds the reference value of arithmetic processing circuit 14. Reference numeral 16 shows a D/A conversion circuit that converts the output signal of hold circuit 15 to an analog signal, reference numeral 17 indicates a comparison circuit that compares the output signals of bottom detection circuit 5 and D/A conversion circuit 16, reference numeral 18 marks a control circuit that generates control signal i for moving an optical pick-up containing photodiode PD and generates reset signal h for resetting hold circuit 15, reference numeral 19 is used for a driver that is driven corresponding to control signal i, and reference numeral 20 indicates a sled motor for moving an optical pick-up corresponding to the output signal of driver 19. Furthermore, a constitution is shown in FIG. 4 that obtains a track detection signal using only the bottom value of an RF signal. In addition, the same reference numerals as those of FIG. 1 are used for those circuit constituents that are identical to FIG. 1.

Figure 5A:
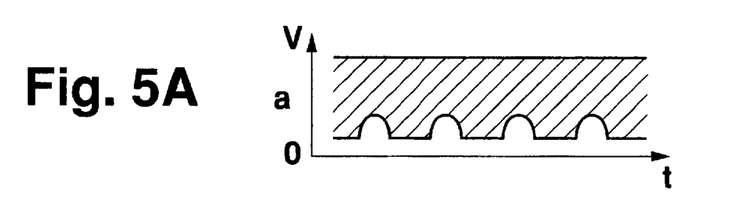
FIGS. 5A, 5B, 5C, 5D and 5E are waveform drawings showing the respective output waveforms of the circuit of FIG. 1.
Figure 5B:
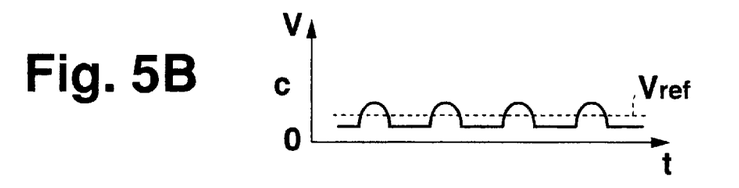

When replacing a disc in FIG. 4 and signal g indicates that disc replacement has been completed, this signal is applied to control circuit 18, which then applies reset signal h to hold circuit 15 causing hold circuit 15 to be reset. In addition, control circuit 18 applies control signal i to driver 19 which causes driver 19 to drive sled motor 20. As a result, an optical pick-up containing photodiodes PDa through PDd is moved in the radial direction of the optical disc at a predetermined speed. In addition, after the addition signals of photodiodes PDa and PDc are amplified by amplification circuit 2, together with being applied to addition circuit 3, the addition signals of photodiodes PDb and PDd are applied to addition circuit 3 after being amplified by amplification circuit 1. Since the spot of light crosses the tracks of the optical disc due to the movement of the optical pick-up, the bottom signal of output signal a of addition circuit 3 changes according to the presence or absence of a track on the optical disc as shown in FIG. 5A. The bottom of output signal a of addition circuit 3 is detected with bottom detection circuit 5, and that output signal c detects the envelope of the bottom signal of output signal a as shown in FIG. 5B.

Output signal c of bottom detection circuit 5 is then converted to a digital signal with A/D conversion circuit 10. In A/D conversion circuit 10, output signal c is sampled at a predetermined sampling frequency, and the sampled value is converted to multiple bit data corresponding to its level. However, although the optical pick-up is moved at a predetermined speed as previously described, this predetermined speed is set in consideration of the sampling frequency of A/D conversion circuit 10. For example, if the optical pick-up is moved at a speed similar to that during track jumping, the change in output signal c of bottom detection circuit 5 is unable to keep up the sampling frequency, thus preventing A/D conversion circuit 10 from accurately converting output signal c of bottom detection circuit 5 to a digital signal. Consequently, in order accurately convert output signal c of bottom detection circuit 5 into a digital signal, the speed of movement of the optical pick-up is changed to a speed such that the sampling frequency of A/D conversion circuit 10 is able to adequately keep up with the change in the output signal of bottom detection circuit 5. This type of speed change is performed when calculating the reference value when the disc is replaced or when the power supply is turned on. In FIG. 4, the speed of the optical pick-up during track jumping is slowed by control signal i.

Output signal j of A/D conversion circuit 10 is applied to maximum value detection circuit 12 and minimum value detection circuit 13 within digital processing circuit 11. Maximum value detection circuit 12 detects the maximum value Vmax of the output signal of A/D conversion circuit 10, while minimum valued detection circuit 13 detects the minimum value Vmin of the output signal of A/D conversion circuit 10. Maximum value Vmax and minimum value Vmin are applied to arithmetic processing circuit 14, and arithmetic processing circuit 14 calculates the reference value for comparison circuit 17. If the reference value is designated as Vr, reference value Vr is calculated based on the following equation in arithmetic processing circuit 14:

$$Vr = (Vmax - Vmin) \times N + Vmin \qquad (1)$$

The reference value is therefore obtained by calculating the difference between maximum value Vmax and minimum value Vmin at a predetermined ratio and then adding minimum value Vmin. N is a coefficient for determining the duty factor of the track detection signal as will be described later, and is defined as $0<N<1$.

Reference value Vr generated on arithmetic processing circuit 14 is applied to hold circuit 15 where it is held. The held reference value Vr is converted to an analog signal with D/A conversion circuit 16, and D/A conversion circuit 16 generates reference voltage Vref. Reference voltage Vref is applied to the negative input terminal of comparison circuit 17. Reference voltage Vref is in a relationship with output signal c of bottom detection circuit 5 as indicated with the broken line in FIG. 5B. When the arithmetic processing and holding of reference value Vr as described above is completed, normal operation of the optical disc playback apparatus begins. Furthermore, setting of this reference voltage Vref is performed each time the disc is replaced. In addition, setting of reference voltage Vref is performed not only when the disc is replaced, but also when the power supply is turned on.

Figure 5C:
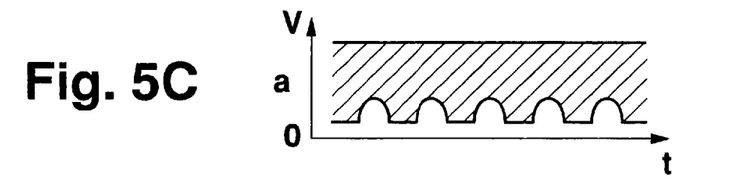
Figure 5D:
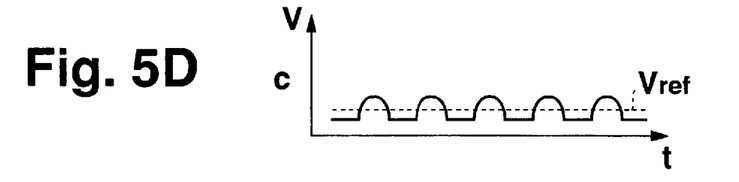
Figure 5E:
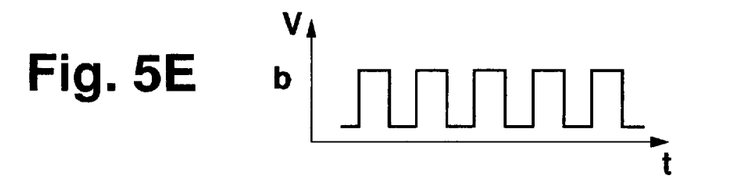

Next, an explanation is provided regarding the operation during the normal track jump operation. The optical pick-up containing photodiodes PDa through PDd moves in the radial direction of the optical disc in accordance with a track jump command. As a result of this movement, output signal a is generated from addition circuit 3 in which the lower level as shown in FIG. 5C changes according to the presence or absence of tracks on the optical disc. The bottom of output signal a of addition circuit 3 is detected with bottom detection circuit 5 to obtain output signal c in which the envelope of the bottom of output signal a is detected as shown in FIG. 5D. Output signal c of bottom detection circuit 5 is compared with reference voltage Vref in comparison circuit 17. The value of reference voltage Vref is obtained prior to the start of normal operation, and during the course of normal operation, is held by hold circuit 15. As a result of comparing output signal c and reference voltage Vref in this manner, "H" and "L" track detection signals k are generated from comparison circuit 17 corresponding to the presence or absence of tracks on the optical disc as shown in FIG. 5E. Track detection signals k of comparison circuit 17 are transmitted to a following track counting circuit and so forth where they are used to count the number of tracks. Furthermore, in order to facilitate the counting of-tracks, it is preferable that the duty factor of output signals k of comparison circuit 17 be approximately 50%. This duty factor changes according to reference voltage Vref. Reference voltage Vref changes according to coefficient N of equation (1). Accordingly, coefficient N in equation (1) is set so that the duty factor of track detection signals k is approximately 50%.

In addition, an explanation is provided regarding a case in which an optical disc is replaced with one that contains a scratch. The operation of setting reference voltage Vref of comparison circuit 17 as described above is performed prior to the start of normal operation. At this time, since a scratch is present on the optical disc, output signal a of addition circuit 3 changes so that the peak level lowers corresponding to the scratch as shown in FIG. 3A. However, since output signal c of bottom detection circuit 5 is a signal that has enveloped the bottom of output signal a as shown in FIG.

5D, it is not affected by the change in the peak signal. Namely, the change in output signal a of addition circuit 3 caused by the presence of the scratch is blocked with bottom detection circuit 5. As a result, setting of reference voltage Vref is not affected by the presence of the scratch, enabling only the signal that changes according to the presence or absence of tracks on the optical disk to be set properly.

Following this operation, during normal track jumping, the peak level of output signal a of addition circuit 3 changes as shown in FIG. 3A due to the scratch on the optical disc. Since the change in level caused by the scratch on the optical disc is blocked with bottom detection circuit 5, output signal c of bottom detection circuit 5 corresponds only to tracks on the optical disc as shown in FIG. 5D. Consequently, output signals k of comparison circuit 17 have levels "L" and "H" corresponding to the presence of absence of tracks.

In this manner, calculation of reference voltage Vref of comparison circuit 17 and generation of track detection signals are performed based entirely on the bottom value of the RF signal, and are not related in any way to an RF signal that has been affected by the presence of a scratch on the optical disc. Consequently, the track detection signals are not affected at all by the scratch on the optical disc.

Figure 5F:
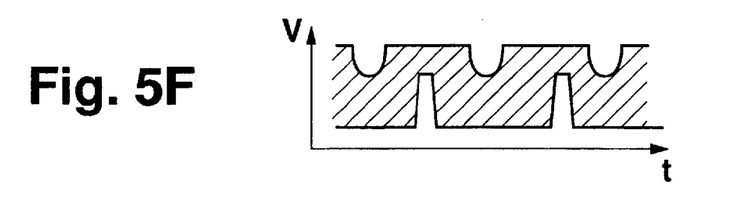
FIG. 5F is a waveform drawing showing the output waveform resulting from another constitution of FIG. 4.

As has been described above, an explanation has been provided regarding the case in which a signal is generated that corresponds to the tracks on an optical disc for the bottom of the output signal of addition circuit 3, while a signal is generated that corresponds to a scratch for the peak. Opposite from the above, however, in a case in which a signal is generated corresponding to tracks on an optical disc for the peak of the output signal of addition circuit 3 while a signal is generated corresponding to a scratch is generated for the bottom, the waveform of the output signal of addition circuit 3 is simply vertically inverted from the waveform of FIG. 3A (see FIG. 5F). Consequently, if a peak detection circuit is used instead of bottom detection circuit 5 as indicated with the broken line in FIG. 4, the effects of a scratch can be removed in the same manner as the circuit of FIG. 4 described above.

What is claimed is:

1. A track detection circuit for an optical disc playback apparatus for detecting tracks on an optical disc crossed by a spot of light moving in the radial direction over the optical disc, comprising:

a detection circuit for detecting either the bottom or peak of a signal obtained by reading the above-mentioned optical disc;

an analog/digital conversion circuit for converting the output signal of said detection circuit to a digital signal;

a digital processing circuit for obtaining a reference value according to the digital signal from said analog/digital conversion circuit;

a digital/analog conversion circuit for generating a reference signal by performing digital/analog conversion on the reference value from said digital processing circuit; and a comparison circuit that compares the output signal from said detection circuit with said reference signal supplied from said digital/analog conversion circuit; wherein, tracks that are crossed are detected based on the comparison output signal from said comparison circuit.

2. A track detection circuit as set forth in claim 1, wherein:

during calculation of the above-mentioned reference value, the speed at which the spot of light crosses the track of the above-mentioned optical disc is maintained at a speed at which the sampling frequency of the above-mentioned analog/digital conversion circuit can respond to the change in the output signal of the above-mentioned detection circuit.

3. A track detection circuit as set forth in claim 1 further comprising:

a maximum value detection circuit for detecting a maximum value of the digital signal from said analog/digital conversion circuit and a minimum value detection circuit for detecting a minimum value of the digital signal from said analog/digital conversion circuit;

an arithmetic processing circuit for determining said reference value by performing arithmetic processing using said detected maximum and minimum values; and a hold circuit for holding the output signal from said arithmetic processing circuit.

4. A track detection circuit as set forth in claim 3, wherein:

the above-mentioned arithmetic processing circuit determines the reference value by calculating $(V_{max} - V_{min}) \times N + V_{min}$ using detected maximum value Vmax, the detected minimum value Vmin, and a coefficient N from 0 to 1.

5. A track detection circuit as set forth in claim 4, wherein:

the coefficient N is set so that the duty factor of the comparison output signal from the comparison circuit is approximately 0.5.

6. A track detection circuit for an optical disc playback apparatus for detecting the tracks on an optical disc crossed by a spot of light moving in the radial direction over the optical disc, comprising:

a detection circuit for detecting a signal obtained by reading an optical disc to obtain a bottom level or peak level that changes when a spot of light moves in the radial direction of an optical disc and crosses a track, but does not change due to the presence of missing data stored on said optical disc;

a reference signal production circuit for producing a reference value based on said bottom level or peak level obtained with said detection circuit; and a comparison circuit for comparing the output signal from said detection circuit and said reference value produced with said reference value production circuit; wherein, tracks that are crossed are detected based on the comparison output signal from said comparison circuit.

7. A track detection circuit as set forth in claim 6 further comprising:

an analog/digital conversion circuit for converting the analog output signal of said detection circuit to a digital signal, which supplies said digital signal to said reference value production circuit; and, a digital/analog conversion circuit for converting said reference value from said reference value production circuit into an analog signal and which supplies said analog signal to said comparison circuit; wherein, said reference value production circuit comprises:

a maximum value detection circuit for detecting a maximum value of the digital signal from said analog/digital conversion circuit and a minimum value detection circuit for detecting a minimum value of the digital signal from said analog/digital conversion circuit; and, an arithmetic processing circuit for determining said reference value by performing arithmetic processing using said detected maximum and minimum values.

8. A track detection circuit as set forth in claim 7 wherein:
in the above-mentioned reference value production circuit and during calculation of the above-mentioned reference value, the speed at which the above-mentioned light spot crosses the track of the above-mentioned optical disc is controlled to a speed at which the sampling frequency of the above-mentioned analog/digital conversion circuit can respond to the change in the output signal of the above-mentioned detection circuit.

9. A track detection circuit as set forth in claim 7 wherein:
the above-mentioned arithmetic processing circuit determines the reference value by calculating $(Vmax-Vmin) \times N + Vmin$ using a detected maximum value Vmax, a detected minimum value Vmin, and a coefficient N from 0 to 1.

10. A track detection circuit as set forth in claim 9 wherein:
the above-mentioned coefficient N is set so that the duty factor of the comparison output signal from the above-mentioned comparison circuit is approximately 0.5.

* * * * *